United States Patent
Kosuge et al.

[11] Patent Number: 6,065,369
[45] Date of Patent: May 23, 2000

[54] AIR BREATHER STRUCTURE IN TRANSMISSION

[75] Inventors: Naoyuki Kosuge, Nagoya; Tomoyuki Hara, Yokohama; Toshiyuki Yamaguchi, Yokohama; Shinzou Gotou, Yokohama, all of Japan

[73] Assignees: Aichi Kikai Kogyo Kabushiki Kaisha, Nagoya; Nissan Motor Co., Ltd., Yokohama, both of Japan

[21] Appl. No.: 09/245,724

[22] Filed: Feb. 8, 1999

[30] Foreign Application Priority Data

Feb. 18, 1998 [JP] Japan .................................. 10-054317
Mar. 18, 1998 [JP] Japan .................................. 10-090941

[51] Int. Cl.⁷ .................................................. F16H 57/02
[52] U.S. Cl. ........................................................ 74/606 R
[58] Field of Search ............................... 74/606 R, 606 A; 184/106

[56] References Cited

U.S. PATENT DOCUMENTS 3,686,973  8/1972  Davison, Jr. et al. ................. 74/606 R
4,468,979  9/1984  Inagaki et al. ........................ 74/606 R
4,554,844  11/1985 Hamano ................................ 74/606 R
4,911,035  3/1990  Taguchi ................................ 74/606 R

FOREIGN PATENT DOCUMENTS 60-215158  10/1985  Japan .
6-117521   4/1994   Japan ................................... 74/606 R

*Primary Examiner*—Mary Ann Battista
*Attorney, Agent, or Firm*—Dennison, Scheiner, Schultz & Wakeman

[57] ABSTRACT

In an air breather structure in a transmission, a partition wall 2 defining an air breather chamber S extends substantially vertically downward in a curved configuration at a distance from a corner portion 1a of a transmission case to increase volume of the air breather chamber S. An oil entrance 4 is formed in an upper portion of the partition wall 2. An oil exit 5 wider than the oil entrance 4 is formed in a lower end portion of the partition wall 2 for discharging oil which enters the air breather chamber S. The oil exit 5 is formed between a lower end of the partition wall 2 and an oil-returning rib 6 projecting from the transmission case for preventing the oil from flowing upward into the air breather chamber S. With this construction, the air breather structure becomes free from "blow of oil".

1 Claim, 1 Drawing Sheet

AIR BREATHER STRUCTURE IN TRANSMISSION

BACKGROUND OF THE INVENTION

1. Field of the Invention

The present invention relates to an air breather structure in a transmission.

2. Description of the Prior Art

Japanese Patent Application Laid-open No. S60-215158 discloses a conventional air breather structure in a transmission. As shown in a schematic sectional view in FIG. 2, an air breather chamber S is defined in a transmission case 1 by a partition wall 2, and in the inner part of the air breather chamber S, an air breather pipe 3 is connected from the outside. An internal pressure caused in the transmission is introduced into the air breather chamber S from an entrance 51 of the air breather chamber S, and the internal pressure is released outside through the air breather pipe 3 to prevent the internal pressure in the transmission from increasing. In the conventional air breather structure, when the internal pressure is released outside from the air breather pipe 3 through the air breather chamber S, there is a problem that oil in the transmission enters the air breather chamber S from the entrance 51. Thus, the oil is blown out outside through the air breather pipe 3, and so-called "blow of oil" is generated.

Thereupon, in order to enhance air/liquid separating performance, it seems to be a good idea to increase volume of the air breather chamber S. However, if the volume of the air breather chamber S is increased, the entrance 1 becomes too wide, and the oil can easily enter the air breather chamber S by the flow of the fluid generated by rotation of gear in the transmission case 1. Further, if the oil is concentrated in a direction of the air breather chamber when the automobile is running down a hill, there is a problem that the oil enters the air breather chamber S.

SUMMARY OF THE INVENTION

The present invention has been accomplished in view of the conventional problems, and it is an object of the invention to provide an air breather structure in a transmission which is free from the "blow of oil". Thus, an air breather structure in a transmission is provided in which an internal pressure generated in the transmission is released outside through an air breather chamber formed inside a transmission case. A partition wall defining the air breather chamber extends substantially vertically downward in a curved configuration at a distance from a corner portion of the transmission case to increase volume of the air breather chamber. An oil entrance is formed in an upper portion of the partition wall. An oil exit wider than the oil entrance is formed in a lower end portion of the partition wall for discharging oil which enters the air breather chamber. The oil exit is formed between a lower end of the partition wall and an oil-returning rib projecting from the transmission case for preventing the oil from flowing upward into the air breather chamber.

With the above structure, since the oil-returning rib is provided for preventing the oil from entering the air breather chamber, the amount of oil entering the air breather chamber is reduced. Further, if the air breather chamber is filled with oil because of concentration of the oil in the air breather chamber when the vehicle is running down a hill, the oil can be excellently discharged out from the air breather chamber. Although the oil enters from the oil entrance by the flow of oil generated by the rotation of the gear when the vehicle is normally running, the oil can effectively be released.

The above and other objects, features and advantages of the invention will become apparent from the following description of the preferred embodiments taken in conjunction with the accompanying drawings.

DETAILED DESCRIPTION OF THE INVENTION

An embodiment of the present invention will be explained based on the drawings below.

Figure 1:
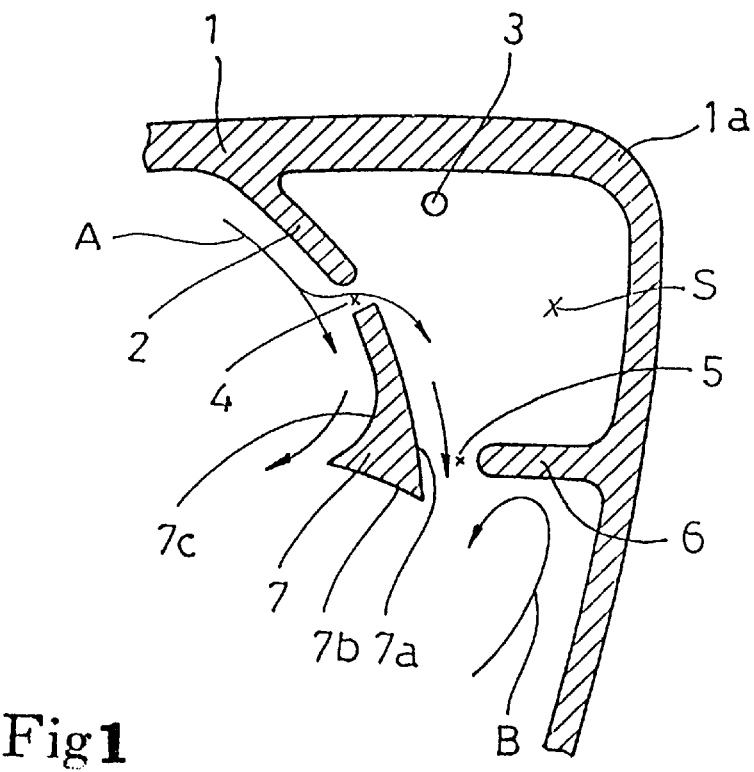
FIG. 1 is a schematic sectional view showing an air breather structure according to an embodiment of the present invention.
Figure 2:
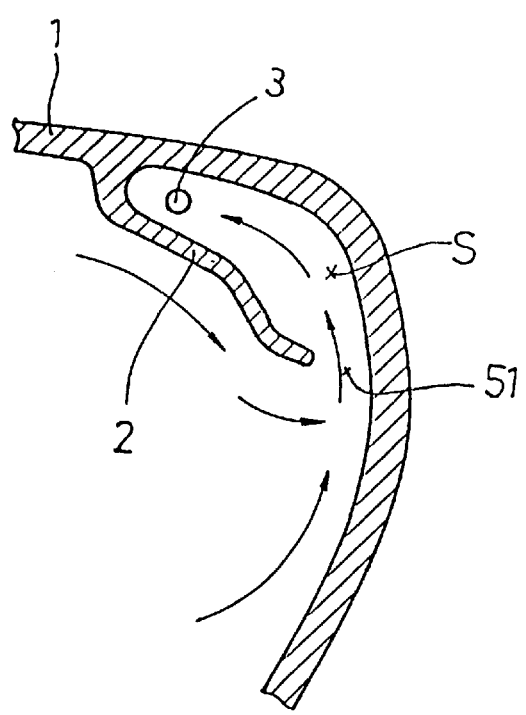
FIG. 2 is a schematic sectional view showing a conventional air breather.

FIG. 1 is a schematic sectional view showing an air breather. Inside a transmission case 1, a partition wall 2 is formed to extend downward to form a curved surface at a distance from a corner portion 1a of the case 1. An air breather chamber S having large volume is formed between the partition wall 2 and a wall of the corner portion 1a of the case 1. An air breather pipe 3 is connected from outside to the case 1 at an upper portion of the air breather chamber S such that the air breather pipe 3 is in communication with the outside. In the present embodiment, an oil entrance 4 is opened in an upper portion of the partition wall 2 at a position lower than the air breather pipe 3, and the lower end of the partition wall 2 is integrally formed with an oil-returning rib piece 7 which is expanded like a trumpet. A part of the oil-returning rib piece 7 on the side of the air breather chamber S is formed with a hanging-down surface 7a extending downward. The oil-returning rib piece 7 is sharply bent from the hanging-down surface 7a upward toward inside of the transmission to form a laterally opened surface 7b. In addition, the oil-returning rib piece 7 is sharply bent upward from an inner end of the laterally opened surface 7b to form a curved surface 7c. Thus, the hanging-down surface 7a, the laterally opened surface 7b and the curved surface 7c form the oil-returning rib piece 7. An oil-returning rib 6 is projects from the case 1 substantially perpendicular thereto. An oil exit 5 which is opened wider than the oil entrance 4 is formed between a tip end of the oil-returning rib 6 and the hanging-down surface 7a.

In such a structure, a flow of oil shown with the arrow A in the drawing is a flow of oil generated by rotation of a final gear, and a flow of oil shown with the arrow B in the drawing is a flow of oil generated by rotation of a transmission gear. The oil shown with the arrow A enters the air breather chamber S from the oil entrance 4, and the oil is then discharged into the transmission from the oil exit 5 which is opened in the lower end side. That is, since the oil exit 5 is provided with the hanging-down surface 7a, the oil flows downward along the hanging-down surface 7a and is efficiently discharged from the oil exit 5. Further, since the partition wall 2 is formed to have a curved surface, the oil passes an inner side of the partition wall 2 and flows in the direction of the arrow A, and bounds back inward of the transmission. Therefore, the amount of oil entering the air breather chamber S is reduced. Even when the oil enters the air breather chamber S, such oil excellently flows down from the oil exit 5 and is then discharged.

The oil shown with the arrow B in the drawing collides against the oil-returning rib 6 and bounds back, so that the oil-returning rib 6 prevents the oil from flowing upward. Therefore, the amount of oil flowing upward from the oil exit 5 into the air breather chamber S is reduced. The oil flowing upward and the oil entering from a lateral direction are bounded back by the laterally opened surface 7b of the oil-returning rib piece 7, so that the oil-returning rib piece 7 can also prevent the oil from flowing upward into the air breather chamber S from the oil exit 5.

Further, if the air breather chamber S is filled with oil because of concentration of the oil on the air breather chamber S when the vehicle is running up a hill, it is possible to excellently discharge the oil from the oil entrance 4.

Therefore, the amount of oil which may enter the air breather chamber S becomes extremely small, and the oil can excellently be discharged from the air breather chamber S. Therefore, the amount of oil entering the air breather pipe 3 becomes extremely small, and the oil may not be blown outside through the air breather pipe 3 as in the conventional structure. As a result, the "blow of oil" can excellently be prevented.

What is claimed is:

1. An air breather structure in a transmission in which an internal pressure generated in said transmission is released outside through an air breather chamber formed inside a transmission case, wherein a partition wall defining said air breather chamber extends substantially vertically downward in a curved configuration at a distance from a corner portion of said transmission case to increase volume of said air breather chamber, an oil entrance is formed in an upper portion of said partition wall, an oil exit wider than said oil entrance is formed in a lower end portion of said partition wall for discharging oil which enters said air breather chamber, said oil exit is formed between a lower end of said partition wall and an oil-returning rib projecting from said transmission case for preventing the oil from flowing upward into said air breather chamber.

* * * * *